US008662456B2

(12) United States Patent
Komiya (10) Patent No.: US 8,662,456 B2
(45) Date of Patent: Mar. 4, 2014

(54) CABLE PROTECTION AND GUIDE DEVICE (75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 13/352,314

(22) Filed: Jan. 17, 2012

(65) Prior Publication Data

US 2012/0205498 A1 Aug. 16, 2012

(30) Foreign Application Priority Data

Feb. 15, 2011 (JP) ................................ 2011-029759

(51) Int. Cl.
F16L 3/00 (2006.01)
F16L 3/22 (2006.01)

(52) U.S. Cl.
USPC ........................... 248/73; 248/68.1; 174/72 R (58) Field of Classification Search
USPC ........ 248/60, 62, 74.1, 74.2, 74.3, 49, 65, 51, 248/68.1, 74.4, 73; 24/265 B, 265 R, 24/265 WS, 268, 19, 335; 59/78.1; 174/68.1, 69, 70 R, 74 R, 77 R, 82, 60, 174/68.3, 72 A, 72 R, 88 R, 95, 96; 439/207, 439/210
See application file for complete search history.

(56) References Cited

U.S. PATENT DOCUMENTS

| | | | | |
|---|---|---|---|---|
| 2,404,531 A * | 7/1946 | Robertson | .................... | 248/68.1 |
| 2,511,524 A * | 6/1950 | Adler | ........................... | 333/124 |
| 3,721,749 A * | 3/1973 | Clabburn | .................... | 174/88 R |
| 3,816,818 A * | 6/1974 | Meier | ........................... | 439/412 |
| 4,269,172 A * | 5/1981 | Parker et al. | ................... | 126/621 |
| 4,349,404 A * | 9/1982 | Changani et al. | .......... | 156/308.4 |
| 4,615,578 A * | 10/1986 | Stadler et al. | ............ | 439/607.47 |
| 4,640,032 A * | 2/1987 | Lewis | ............................ | 40/316 |
| 4,927,984 A * | 5/1990 | Meislitzer et al. | ............. | 174/92 |
| 5,033,542 A * | 7/1991 | Jabs | .............................. | 165/162 |
| 5,167,388 A * | 12/1992 | Blair | ........................... | 248/68.1 |
| 6,428,344 B1 * | 8/2002 | Reed | ............................ | 439/455 |
| 6,858,797 B2 * | 2/2005 | Sheikholeslami et al. | ..... | 174/480 |
| 6,902,138 B2 * | 6/2005 | Vantouroux | ................ | 248/68.1 |
| 6,984,782 B2 * | 1/2006 | Ikeda et al. | ................ | 174/21 JS |
| 7,617,669 B1 * | 11/2009 | Komiya et al. | ................ | 59/78.1 |
| 7,784,259 B2 * | 8/2010 | O'Rourke et al. | ............. | 59/78.1 |
| 7,973,250 B2 * | 7/2011 | Groeller et al. | ............... | 174/481 |
| 8,155,755 B2 * | 4/2012 | Flynn et al. | ................... | 607/116 |
| 8,561,949 B2 * | 10/2013 | Komiya et al. | ................. | 248/73 |
| 2011/0121141 A1 * | 5/2011 | Tatsuta et al. | ................... | 248/49 |
| 2012/0091293 A1 * | 4/2012 | Ninomiya | .................... | 248/74.2 |
| 2012/0267164 A1 * | 10/2012 | Reuss et al. | ................ | 174/70 R |

FOREIGN PATENT DOCUMENTS

| | | | | |
|---|---|---|---|---|
| JP | 4157096 | 7/2008 | | |
| WO | WO 9000824 A1 * | 1/1990 | ............ | H02G 11/06 |
| WO | 2004049509 A3 | 6/2004 | | |

* cited by examiner

*Primary Examiner* — Jonathan Liu
*Assistant Examiner* — Guang H Guan
(74) *Attorney, Agent, or Firm* — Woodling, Krost and Rust (57) ABSTRACT

There is provided an articulated cable protection and guide apparatus that can securely guide cables between a machine frame-side fixing end area and a machine movable-side moving end area without scattering abrasion powder of the articulated supporting members and the cables to the outside and that can be easily installed in the machine frame-side fixing end area and the machine movable-side moving end area. Connector units, fixed to the machine frame-side fixing end area and the machine movable-side moving end area, integrally retain articulated end portions of the articulated supporting member, cable end portions of the cables and slot end portions of the flexible belt member and seal the slot end portions of the flexible belt member.

14 Claims, 9 Drawing Sheets

FIG. 11

CABLE PROTECTION AND GUIDE DEVICE

CROSS REFERENCE TO RELATED APPLICATIONS

This application claims the foreign priority benefit under Title 35, United States Code, §119(a)-(d) of Japanese Patent Application No. 2011-029759, filed on Feb. 15, 2011 in the Japan Patent Office, the disclosure of which is herein incorporated by reference in its entirety.

BACKGROUND OF THE INVENTION

1. Field of the Invention

The present invention relates to an articulated cable protection and guide apparatus for protecting and guiding flexible cables and hoses such as electric cables, optical fiber cables and fluid supplying hoses (referred to as 'cables' hereinafter) used for machine tools, electronic devices, industrial robots, transportation machines and others to feed power, fluid, air and other mediums to those moving machines or to a moving part of the machines.

2. Related Art

If cables are to be connected to a moving body of a machine tool, a civil engineering machine, a conveying apparatus and other devices without protection in an exposed state, the cables may be damaged by causing intolerable torsion or tension when they are moved. Then, a cable protection and guide device for supporting and guiding those cables is used.

In Japanese Patent No. 4157096 (Claims, Paragraphs [0031] through [0034], FIG. 21) a prior art cable protection and guide apparatus is disclosed. The disclosure includes conductors, conduits for conveying gas, and supporting members composed of continuous material strips. The supporting members each having a series of non-interlocked action-limited solid bodies are sealed within a plurality of channels and are disposed in parallel.

Problems to be Solved by the Invention

In the prior art cable protection and guide apparatus, the flexible material composing the supporting member is stainless steel or a leaf spring. The prior art cable protection and guide apparatus is difficult to install within a predetermined space because it is unable to keep an accurate bending radius in taking a bending posture, its bending radius becomes large and it may contact a nearby obstacle. When stainless steel is used for the flexible member in particular, the prior art cable protection and guide apparatus may cause a fatigue breakdown and rupture, resulting from long use, and subsequently becomes unusable.

Because the flexible material composing the supporting member is stainless steel or a leaf spring which cannot be easily cut and connected, the supporting member of the prior art device cannot be replaced. The prior art cable protection and guide apparatus also has a problem that it may cause resonance and destabilize actions such as bending posture and straight posture because its torsional rigidity is low when it is bent (rotated).

The prior art cable protection and guide apparatus cannot be mass-produced because pieces formed of resin must be injection-molded one by one (one at a time) to the stainless steel or leaf spring.

In the prior art, the conduits and the supporting members are exposed in a condition in which an end of a jacket component is opened in a machine frame-side fixing end area or a machine movable-side moving end area. The jacket component is retained by a pair of upper and lower clamping means in the prior art cable protection and guide apparatus and abrasion powder of the conductors from the conduits and the supporting members is generated within the jacket component and scatters from the opened end of the jacket component to the outside and contaminates the environment including the conductors, the conduits and the supporting members.

The prior art cable protection and guide apparatus may also cause such troubles that the jacket component directly clamped by the clamping means is damaged or the supporting members fall out of the jacket component abruptly. These problems are caused by betiding actions of the supporting members which are repeated for a long period of time. When this happens, the prior art device is unable to securely guide the conductors and the conduits.

The prior art cable protection and guide apparatus has a cumbersome problem in that its decomposing and assembling works are complex because the conductors, the conduits and the supporting members cannot be removed out of the machine frame-side fixing end area or the machine movable-side moving end area.

SUMMARY OF THE INVENTION

Accordingly, the present invention aims at solving the aforementioned prior art problems by providing an articulated cable protection and guide apparatus that can securely guide cables between a machine frame-side fixing end area and a machine movable-side moving end area while assuring a clean cable protection and guide environment without scattering abrasion powder of articulated supporting members and the cables to the outside and that can be easily installed in the machine frame-side fixing end area and the machine movable-side moving end area.

Means for Solving the Problems

In order to solve the aforementioned problems, according to a first aspect of the invention, an articulated cable protection and guide apparatus, comprises:

a plurality of cables;

each of the cables includes first and second cable end portions;

an articulated supporting member;

the articulated supporting member includes: a large number of synthetic resin block bodies linked with each other; the synthetic resin block bodies operating between a straight posture and a bending posture; a first articulated end portion, and, a second articulated end portion;

a machine;

the machine includes a machine frame-side fixing end area and a machine movable-side moving end area;

a flexible belt member;

the flexible belt member includes a length, a width, a first slot end portion and a second slot end portion;

the flexible belt member includes a plurality of tubular storing portions, the articulated supporting member separately inserted in one of the plurality of tubular storing portions; each of the cables separately inserted in respective other ones of the plurality of tubular storing portions; and, the articulated supporting member and the cables stored and formed in parallel;

the cables being protected within the other ones of the tubular storing portions of the flexible belt member and guided between the machine frame-side fixing end area and the machine movable-side moving end area;

a first connector unit and a second connector unit;

the first connector unit affixed to the machine frame-side fixing end area and the second connector unit affixed to the machine movable-side moving end area;

the first connector integrally retains the first articulated end portion of the articulated supporting member, the first connector integrally retains the first cable end portions, and the first connector integrally retains the first slot end portion of the flexible belt member;

the first connector seals the first slot end portion of the flexible belt member against the first cable end portions and against the first articulated end portion of the articulating support member;

the second connector integrally retains the second articulated end portion of the articulated supporting member, the second connector integrally retains the second cable end portions, and the second connector integrally retains the second slot end portion of the flexible belt member; and, the second connector seals the second slot end portion of the flexible belt member against the second cable end portions and against the second articulated end portion of the articulating support member.

According to a second aspect of the articulated cable protection and guide apparatus of the invention, the first connector unit comprises:

an elastically deformable dust-proofing protector;

the elastically deformable dust-proofing protector includes upper and lower circumferential parts;

synthetic resin pressing pads;

a pair of clamping plates;

the dust-proofing protector surrounding the first slot end portion of the flexible belt member and the cables;

the synthetic resin pressing pads attached at upper and lower outer circumferential parts of the dust-proofing protector, the synthetic resin pressing pads residing intermediate the pair of clamping plates and the dust-proofing protector;

the clamping plates gripping and cushioning the dust-proofing protector through the intermediate pair of synthetic resin pressing pads; and a fixing means for fixing the pair of clamping plates to the machine frame-side fixing end area.

Still according to a second aspect of the articulated cable protection and guide apparatus of the invention, the second connector unit comprises:

an elastically deformable dust-proofing protector;

the elastically deformable dust-proofing protector includes upper and lower circumferential parts;

synthetic resin pressing pads;

a pair of clamping plates;

the dust-proofing protector surrounding the second slot end portion of the flexible belt member and the cables;

the synthetic resin pressing pads attached at upper and lower outer circumferential parts of the dust-proofing protector, the synthetic resin pressing pads residing intermediate the pair of clamping plates and the dust-proofing protector;

the clamping plates gripping and cushioning the dust-proofing protector through the intermediate pair of synthetic resin pressing pads; and a fixing means for fixing the pair of clamping plates to the machine movable-side moving end area.

According to a third aspect of the articulated cable protection and guide apparatus of the invention, the dust-proofing protector comprises a dust-proofing protector proximal end portion clamped through the intermediate pair of synthetic resin pressing pads;

the dust-proofing protector comprises a plurality of tapered insertion portions projecting from the dust-proofing protector proximal end portions, respectively, at least per every first cable end portion of the cables; and, the cable end portions residing within a respective one of the plurality of tapered insertion portions.

According to a fourth aspect of the articulated cable protection and guide apparatus of the invention, the synthetic resin pressing pads are disposed respectively in a curved state straddling over the dust-proofing protector.

According to a fifth aspect of the articulated cable protection and guide apparatus of the invention is disclosed, wherein the dust-proofing protector is molded out of a material more elastically deformable than the synthetic resin pressing pads.

According to a sixth aspect of the articulated cable protection and guide apparatus of the invention, the flexible belt member is molded out of synthetic resin materials.

According to a seventh aspect of the articulated cable protection and guide apparatus of the invention:

each of the synthetic resin block bodies includes a link pin provided at a front side surface region of each the synthetic resin block body composing the articulated supporting member, each of the synthetic resin block bodies includes a link hole provided at a rear side surface region; and, the link pin is axially supported by a link pin hole provided at a rear side surface region of a preceding synthetic resin block body.

According to an eighth aspect of the articulated cable protection and guide apparatus of the invention, each of the synthetic resin block bodies includes:

a surface; and, a tapered cutaway fitting portion for concavo-convexly and vertically fitting the link pin of the front side surface region to the link pin hole of the rear side surface region is concavely provided continuously from the surface to the link pin hole of the rear side surface region.

According to a ninth aspect of the articulated cable protection and guide apparatus of the invention, each of the synthetic resin block bodies is provided with a straight posture keeping plane for maintaining the synthetic resin block bodies in a straight condition and a bending posture keeping plane for maintaining the synthetic resin block bodies in a bending condition.

It is noted here that the basic concept of the term "flexible belt member" of the invention means a belt-like long item that can take the straight condition and the bending condition.

Advantageous Effects of the Invention

According to the first aspect of the articulated cable protection and guide apparatus of the invention, the articulated cable protection and guide apparatus comprises the articulated supporting member that is composed of a large number of synthetic resin block bodies linked with each other and operates between the straight posture and the bending posture. The flexible belt member includes a plurality of tubular storing portions through which the articulated supporting member and the cables and are separately inserted and stored in parallel in the belt width direction. It is possible to guide the cables and protect them within the plurality of tubular storing portions between the machine frame-side fixing end area and the machine movable-side moving end area while operating between the straight posture and the bending posture. This structures brings about the following peculiar effects.

According to the first aspect of the articulated cable protection and guide apparatus of the invention, the articulated supporting member can be obtained by linking the synthetic resin block bodies with each other. The synthetic resin block bodies are manufactured in mass quantities. The prior art requires injection-molding pieces one by one to stainless steel or a leaf spring as disclosed and described above.

Accordingly, it becomes possible to cut and connect the articulated supporting member easily corresponding to the desired usage. This is compared to a prior art flexible material, composing a supporting member formed of stainless steel that is hard to cut and connect. The invention remarkably reduces the number of parts required.

Because the flexible belt member is formed such that the plurality of tubular storing portions into which the articulated supporting member and the cables are respectively inserted and stored in parallel in the belt width direction, the cables are inserted, and stored into the tubular storing portions without contacting the articulated supporting member.

Accordingly, it becomes possible to avoid the cable wear and damage by the articulated supporting member, to avoid entanglement of the cables that is prone to occur among them and to guide the large number of cables orderly and stably.

Because the connector units to be fixed to the machine frame-side fixing end area and the machine movable-side moving end area integrally retain the articulated end portions of the articulated supporting member, the cable end portions of the cables and the slot end portions of the flexible belt member and seal the slot end portions of the flexible belt member, abrasion powder of the articulated supporting member and the cables produced within each tubular storing portion of the flexible belt member in bending and moving the cables is contained within the flexible belt member and is not scattered to the outside.

Accordingly, it becomes possible to assure a clean environment, to securely fix the plurality of cables to the machine frame-side fixing end area and/or the machine movable-side moving end area while they are integrated with the connector units, it is easy to install the articulated cable protection and guide apparatus to the machine frame-side fixing end area and the movable-side moving end area and to guide the cables while flexibly and freely taking the straight posture and the bending posture between the machine frame-side fixing end area and the movable-side moving end area.

According to the second aspect of the articulated cable protection and guide apparatus of the invention, the connector unit comprises the elastically deformable dust-proofing protector into which the slot end portions of the flexible belt member fit. The articulated supporting member and the cables are inserted into the flexible belt member. The synthetic resin pressing pads are attached to the upper and lower outer circumferential parts of the dust-proofing protector. The pair of clamping plates clamp the dust-proofing protector through an intermediate pair of synthetic resin pressing pads. The fixing means for fixing the pair of clamping plates to the machine frame-side fixing end area or the machine movable-side moving end area provide the clamping force. While being inserted through the clamping plates, the flexible belt member, through which the articulated supporting member and the cables are respectively inserted, is elastically clamped by the dust-proof protector by and through the pair of synthetic resin pressing pads.

Accordingly, it becomes possible to exhibit the cushioning mechanism and to prevent the flexible belt member from being unintentionally damaged if intolerable force acts on the flexible belt member while bending and moving the cables. It becomes possible to achieve decomposing (taking apart) and assembling of the connector unit easily and quickly in maintaining the articulated supporting member and the cables.

According to the third aspect of the articulated cable protection and guide apparatus of the invention, the dust-proofing protector comprises the dust-proofing protector proximal end portion clamped through the intermediate pair of synthetic resin pressing pads. A plurality of tapered insertion portions projecting from the dust-proofing protector proximal end portion, respectively, at least per every cable end of the cables is provided. The cables are inserted through the tapered insertion portions. It becomes possible to make the dust-proofing protector proximal end portion elastically deformable corresponding to outer circumferential shapes of the articulated supporting member and the cables.

Accordingly, the dust-proofing protector proximal end portion can adhere and securely retain and seal the articulated supporting member and the cables even if diameters and sectional shapes of the articulated supporting member and the cables are different from each other.

Because it is possible to adjust a cutting size of the tapered insertion portion and to cut and open the tapered insertion portion so that the tapered insertion portion is opened in a manner close to an outer circumference and diameter of the cables, it becomes possible to completely contain the abrasion powder of the articulated supporting member and the cables produced within the individual tubular storing portions of the flexible belt member in bending and moving the cables within the individual tubular storing portions of the flexible belt member.

According to the fourth aspect of the articulated cable protection and guide apparatus of the invention, because the synthetic resin pressing pads are disposed respectively in the curved state straddling over dust-proofing protector proximal end portion, the articulated end portions of the articulated supporting member and the cable end portions of the cables, both side edges of the synthetic resin pressing pad are positioned while biting into the dust-proofing protector proximal end portion in the curved condition. The dust-proofing protector proximal end portion straddles over the articulated end portions of the articulated supporting member and the cable end portions of the cables when the dust-proofing protector is clamped by the pair of clamping plates through the intermediate pair of synthetic resin pressing pads.

Accordingly, it becomes possible to prevent mutual side slip of the articulated end portions of the articulated supporting member and the cable end portions of the plurality of cables in bending and moving the cables.

According to the fifth aspect of the articulated cable protection and guide apparatus of the invention, because the dust-proofing protector is molded out of material which is more elastically deformable than the synthetic resin pressing pad, the dust-proofing protector elastically deforms, preferentially, more than the synthetic resin pressing pad and fits and adheres to the outer circumferential shapes of the articulated supporting member and the cables. The dust-proofing protector is clamped by the pair of clamping plates through the intermediate pair of synthetic resin pressing pads.

Accordingly, the deformation of the synthetic resin pressing pads is due to the pair of clamping plates. The dust-proofing protector is deformed by the force of the synthetic resin pressing pads which grips and seals the cables and the articulated supporting member. The pair of clamping plates can securely retain the articulated supporting member and the cables through the intermediate dust-proofing protector and the intermediate pair of synthetic resin pressing pads.

According to the sixth aspect of the articulated cable protection and guide apparatus of the invention, because the flexible belt member is molded out of synthetic resin materials, it becomes possible to easily work and mold the shape of the synthetic resin block bodies composing the flexible belt member.

Accordingly, it becomes possible not only to produce the light-weight flexible belt member corresponding to shapes of the cables, but also to reduce sliding abrasion that is prone to be caused between the flexible belt member and the cables because the synthetic resin material, i.e., the flexible belt member, exhibits its self-lubricant effect.

According to the seventh aspect of the articulated cable protection and guide apparatus of the invention, because the link pin provided at the front side surface region of each synthetic resin block body composing the articulated supporting member fits within the link pin hole provided at the rear side surface region of the preceding synthetic resin block body, the link pin of the succeeding synthetic resin block body is axially and rotatably supported by the link pin hole of the preceding synthetic resin block body.

Accordingly, the synthetic resin block bodies of the articulated supporting member shift from the straight posture to the bending posture or from the bending posture to the straight posture smoothly and can guide the cables smoothly.

According to the eighth aspect of the articulated cable protection and guide apparatus of the invention, because the tapered cutaway fitting portion of each synthetic resin block body is concavo-convexly and vertically fitting, the link pin of the front side surface region of one body is easily fitted to the link pin hole of the rear side surface region of the next adjacent body. A concave contour is provided continuously from the surface to the link pin hole of the rear side surface region enabling the link pin of the succeeding synthetic resin block body to be inserted easily therein. The link pin hole of the preceding synthetic resin block body is accessible via the tapered cutaway fitting portion thereof without requiring excessive fitting force in cutting and connecting the synthetic resin block bodies of the articulated supporting member.

According to the ninth aspect of the articulated cable protection and guide apparatus of the invention, the synthetic resin block body is provided with the straight posture keeping plane for maintaining the synthetic resin block bodies in the straight condition and the bending posture keeping plane for maintaining the synthetic resin block bodies in the bending condition, the straight posture keeping plane and the bending posture keeping plane position retain the articulated supporting member in the straight posture and the bending posture required to guide the cables.

Accordingly, it becomes possible to securely protect and guide the cables that take the bending posture and the straight posture even in an installation space in which obstacles are closely located.

BEST MODE FOR CARRYING OUT THE INVENTION

Embodiment

One embodiment of an articulated cable protection and guide apparatus of the invention will be explained with reference to FIGS. 1 through 11.

Figure 1:
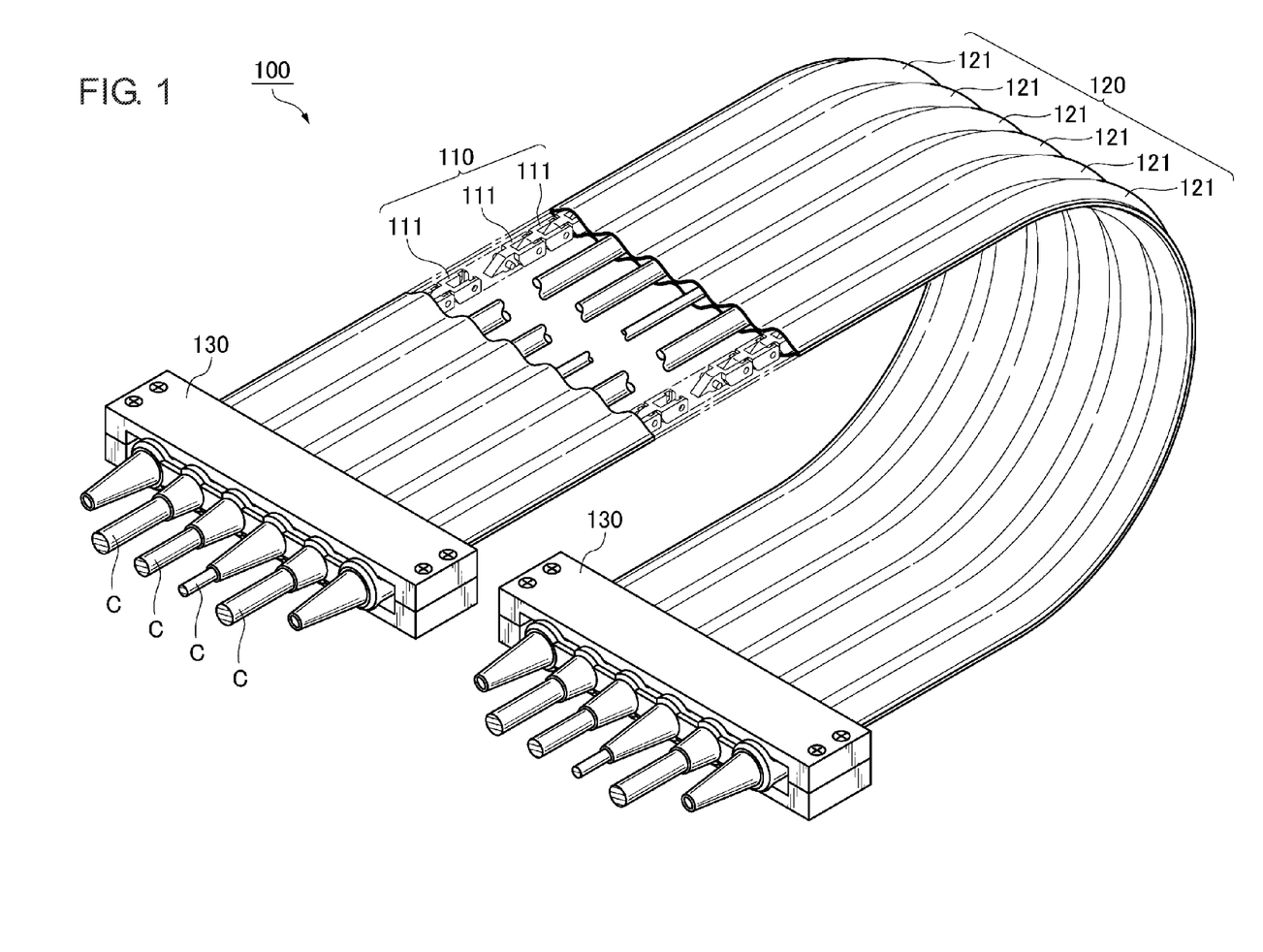
FIG. 1 is a schematic drawing of an articulated cable protection and guide apparatus of an embodiment of the invention.
Figure 2:
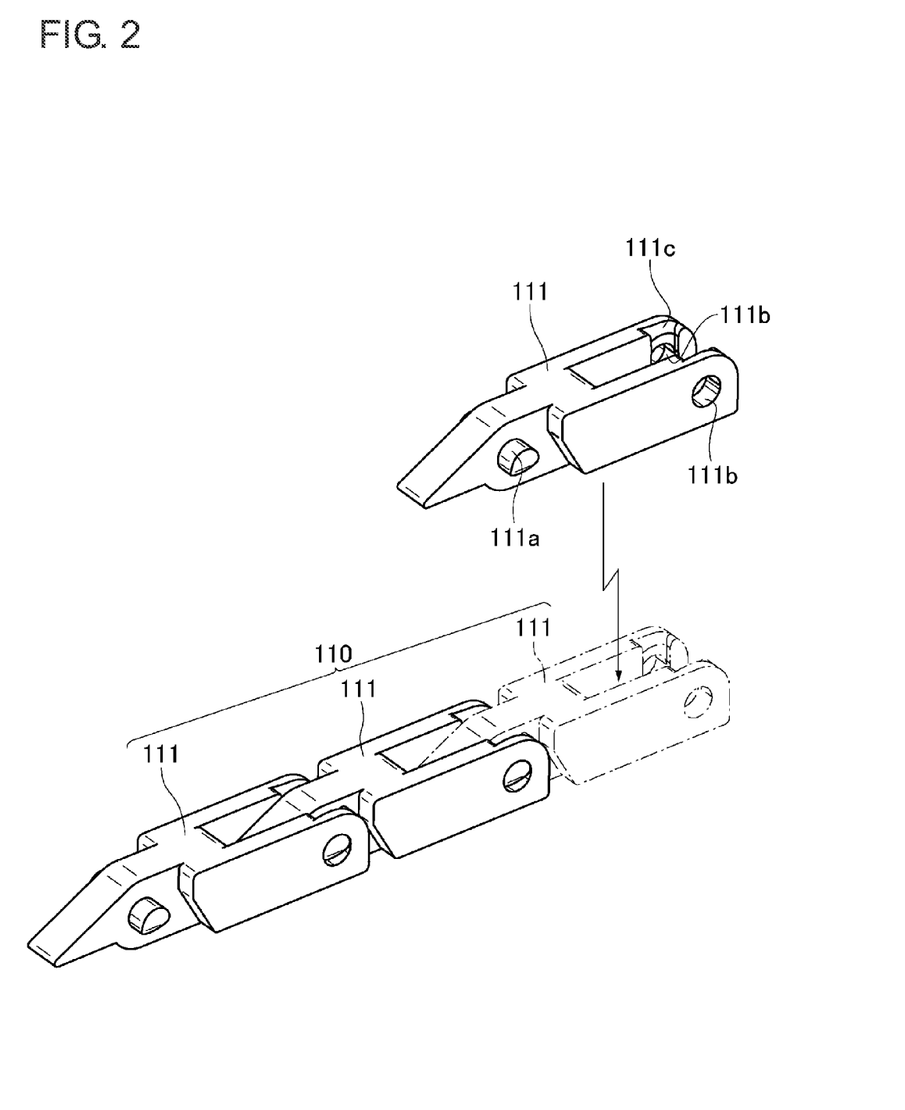
FIG. 2 is an exploded view of an articulated supporting member used in the invention.
Figure 3:
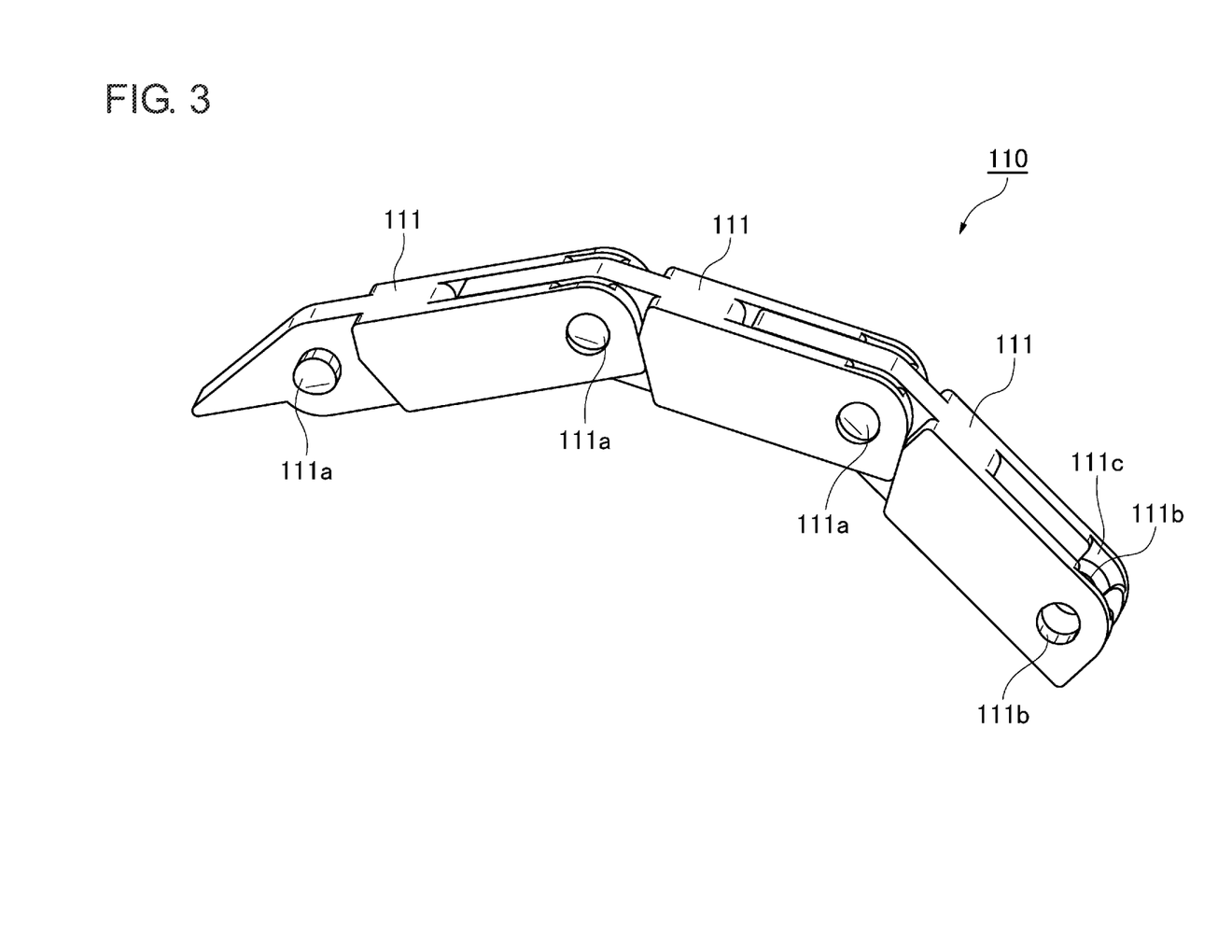
FIG. 3 is a perspective view showing a bending state of the articulated supporting member shown in FIG. 2.
Figure 4:
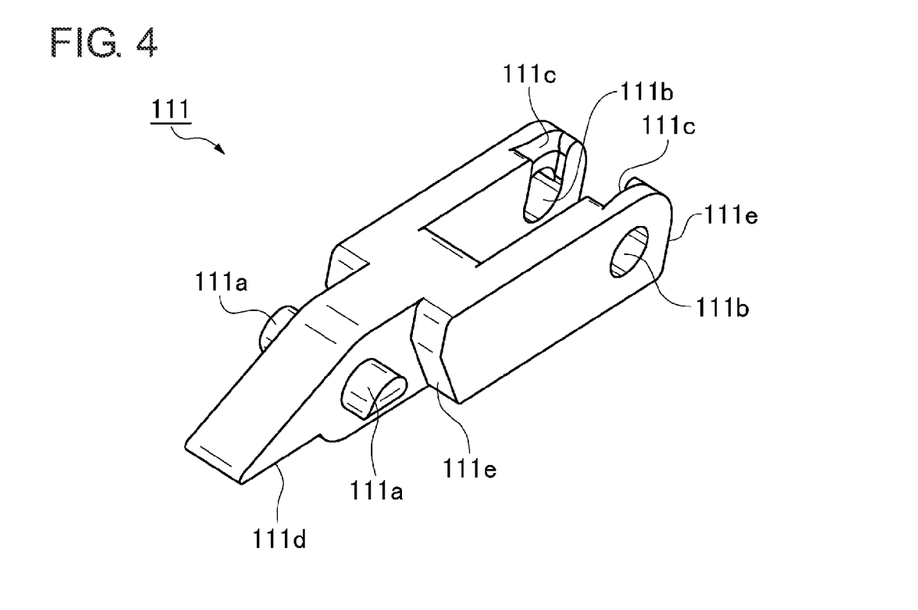
FIG. 4 is a perspective view of a synthetic resin block body shown in FIG. 2 seen from an obliquely front upper side.
Figure 5:
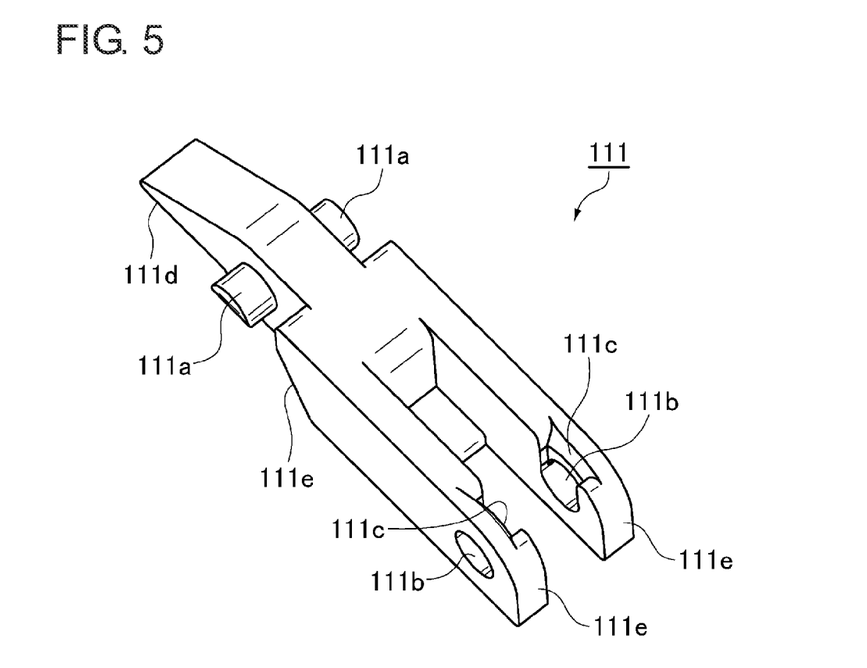
FIG. 5 is a perspective view of the synthetic resin block body shown in FIG. 2 seen from an obliquely rear upper side.
Figure 6:
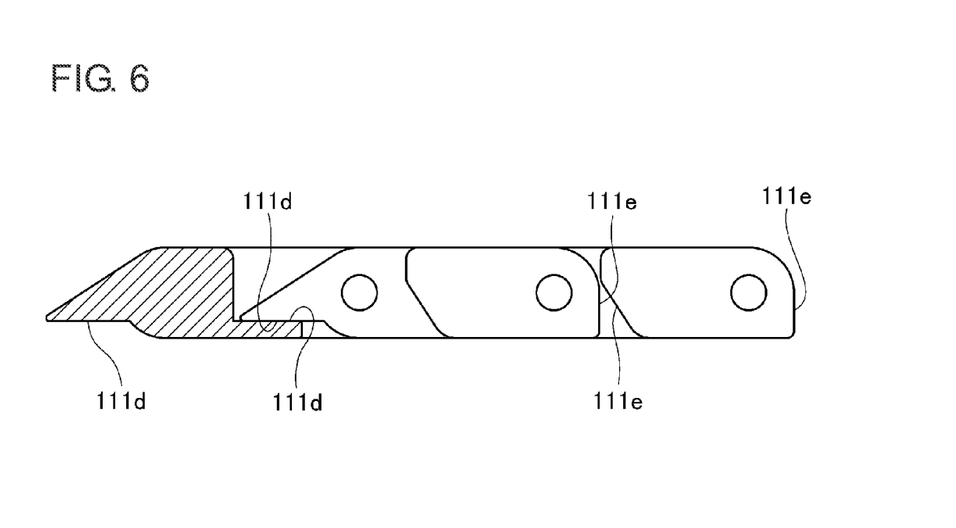
FIG. 6 is a side view showing a straight state of the articulated supporting member shown in FIG. 2.
Figure 7:
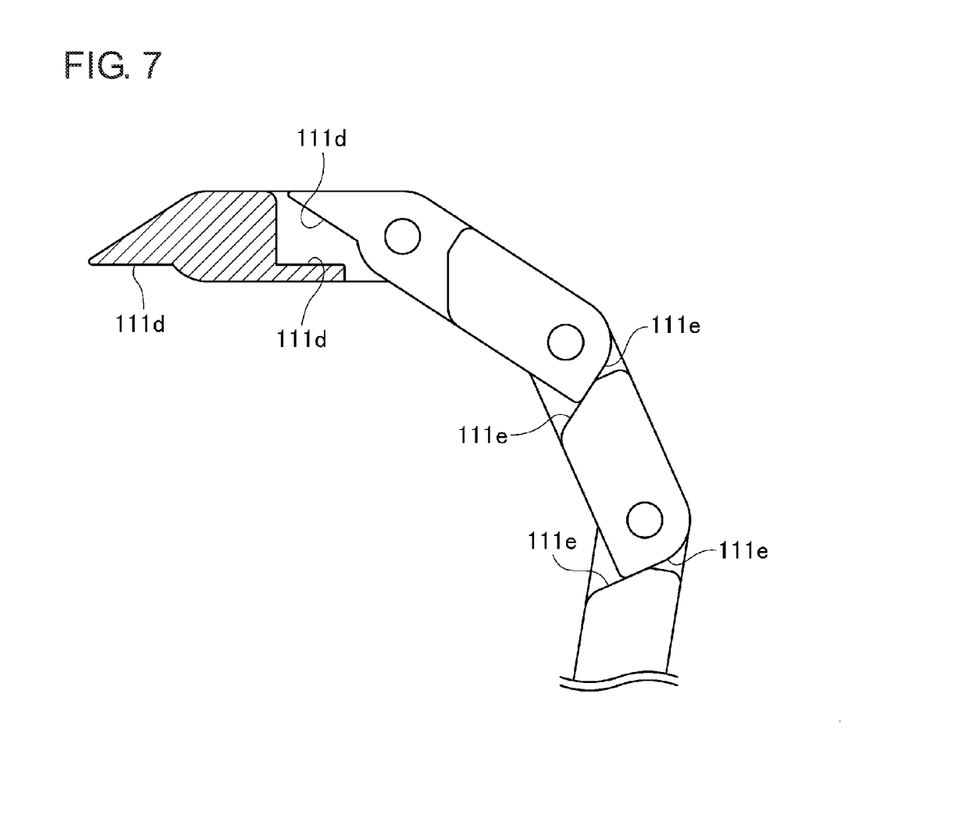
FIG. 7 is a side view showing the bending state of the articulated supporting member shown in FIG. 2.
Figure 8:
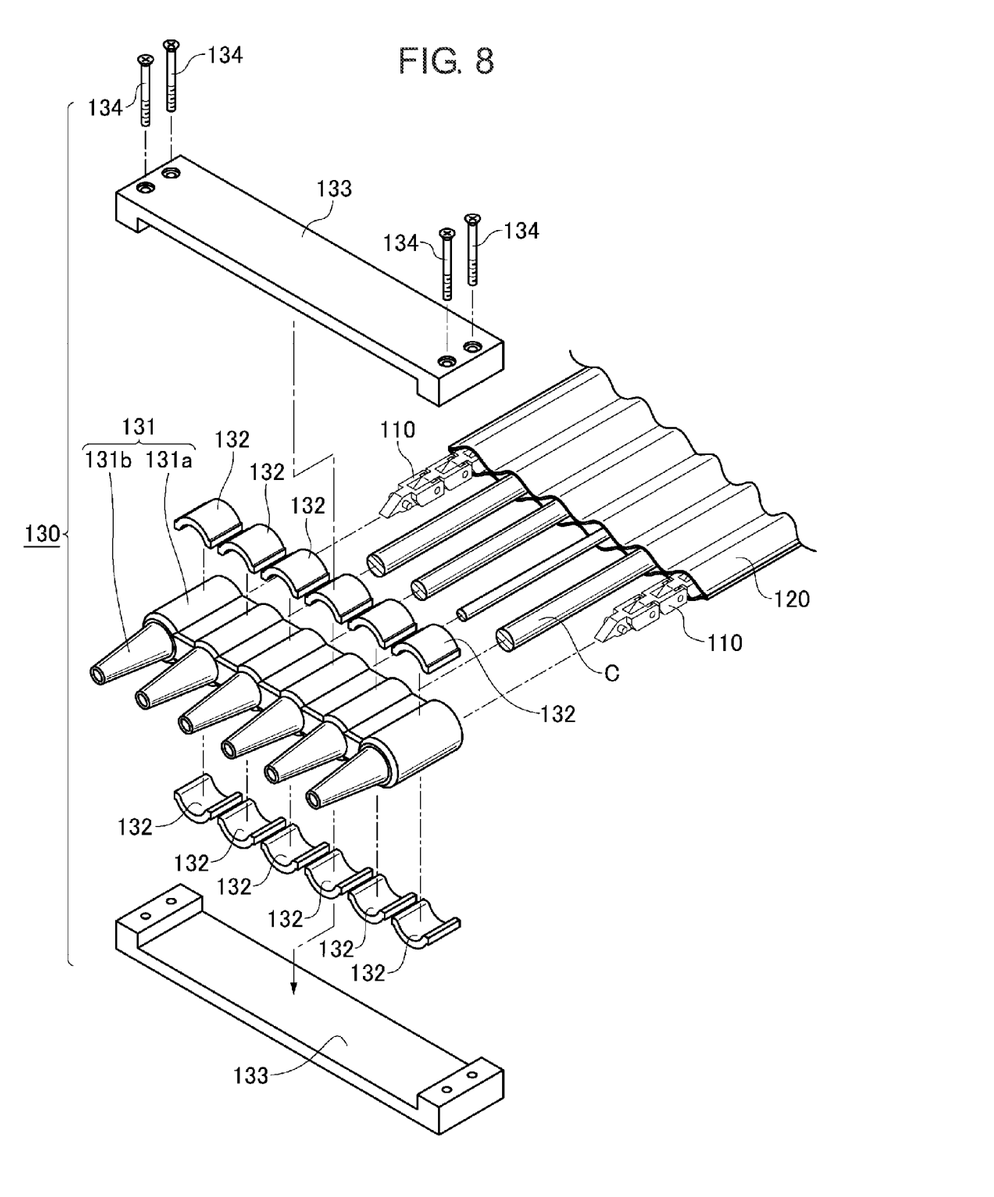
FIG. 8 is an exploded view of a connector unit used in the invention.
Figure 9:
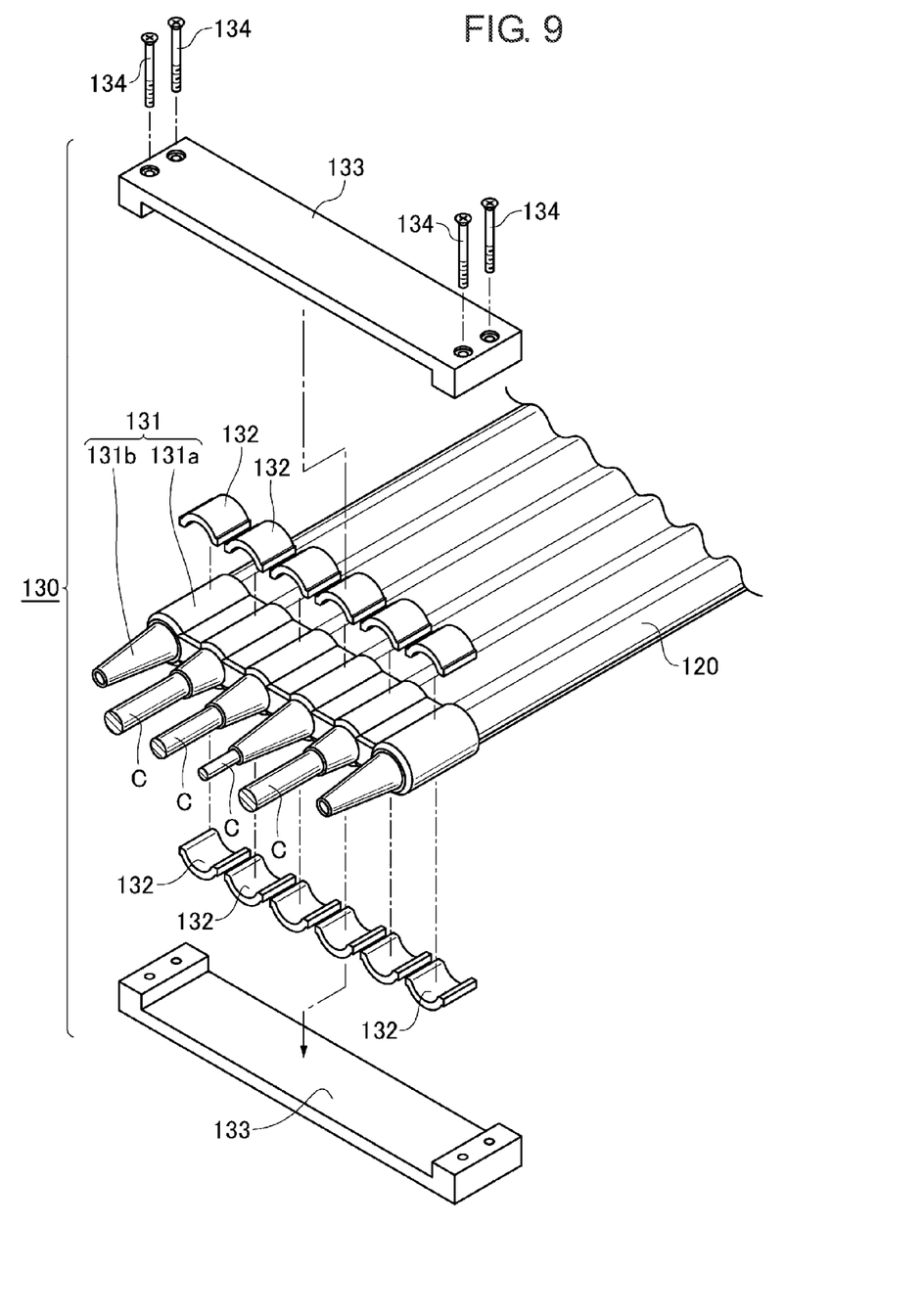
FIG. 9 is a partially assembled view of the connector unit used in the invention.
Figure 10:
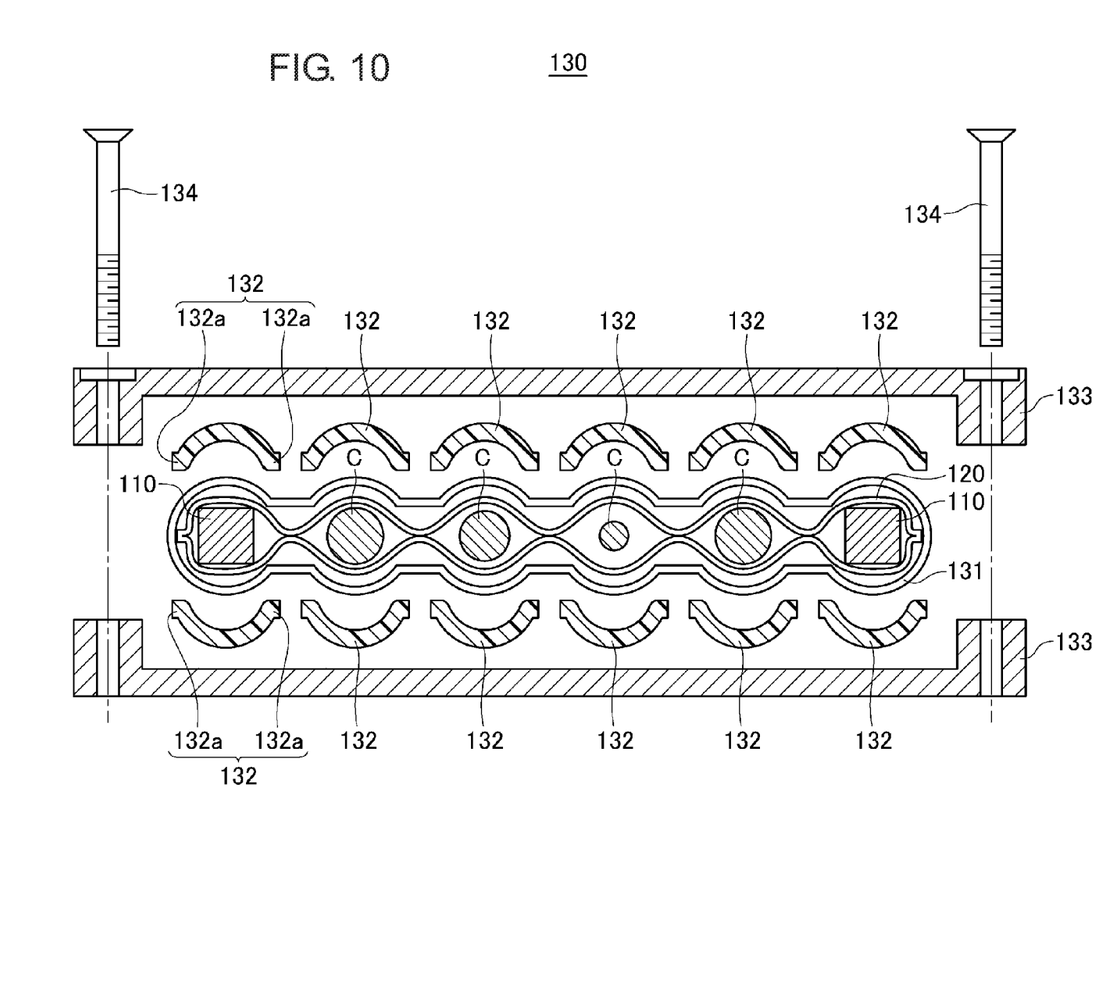
FIG. 10 is a section view showing a state before clamping by a clamping plate of the invention; and, FIG. 11 is a section view showing a state after clamping by the clamping plate of the invention.
Figure 11:
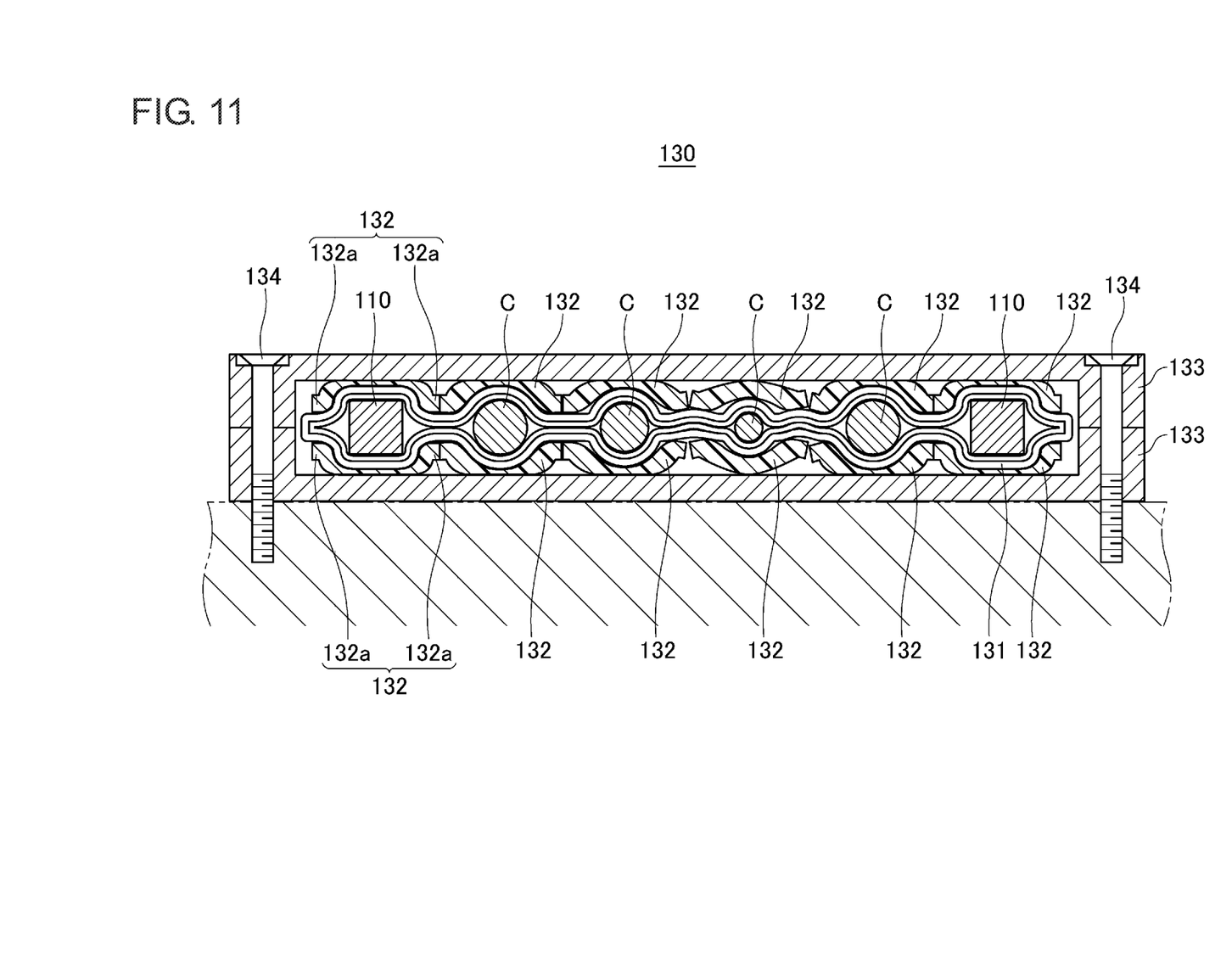

Here, FIG. 1 is a schematic drawing of an articulated cable protection and guide apparatus of an embodiment of the invention. FIG. 2 is an exploded view of an articulated supporting member used in the invention. FIG. 3 is a perspective view showing a bending state of the articulated supporting member shown in FIG. 2. FIG. 4 is a perspective view of a synthetic resin block body shown in FIG. 2 seen from an obliquely front upper side. FIG. 5 is a perspective view of the synthetic resin block body shown in FIG. 2 seen from an obliquely rear upper side. FIG. 6 is a side view showing a straight state of the articulated supporting member shown in FIG. 2, FIG. 7 is a side view showing the bending state of the articulated supporting member shown in FIG. 2. FIG. 8 is an exploded view of a connector unit used in the invention. FIG. 9 is a partially assembled view of the connector unit used in the invention. FIG. 10 is a section view showing a state before clamping by a clamping plate of the invention, and FIG. 11 is a section view showing a state after clamping by the clamping plate of the invention.

As shown in FIG. 1, the articulated cable protection and guide apparatus 100 of the embodiment of the invention protects and guides flexible cables and hoses such as electric cables, optical fiber cables and fluid supplying hoses (referred to as 'cables and the like C' hereinafter) used for machine tools, electronic devices, industrial robots, transportation machines and others to feed power, fluid, air and others to those moving machines or to a moving part of the machines.

As shown in FIG. 1, the articulated cable protection and guide apparatus 100 of the present embodiment of the invention comprises an articulated supporting member 110 that includes a large number of synthetic resin block bodies 111 linked with each other. The synthetic resin block bodies operate between a straight posture and a bending posture. A flexible belt member 120 includes a plurality of tubular storing portions 121 through which the articulated supporting member 110 and/or cables, C, are inserted and stored in parallel in a belt width direction. Connector units 130 integrally retain articulated end portions of the articulated supporting member 110, cable end portions of the cables, C, and slot end portions of the flexible belt member 120. Connector units 130 seal the slot end portions of the flexible belt member 120, Cables, C, are protected and guided between the machine frame-side fixing end area and the machine movable-side moving end area within the tubular storing portions 121 of the flexible belt member 120 by fixing the connector units 130, 130, respectively, at the machine frame-side fixing end area and the machine movable-side moving end area.

The articulated supporting member 110 described above includes a large number of synthetic resin block bodies 111 that fit concavo-convexly with each other and that are flexibly linked as shown in FIGS. 2 through 5.

The articulated supporting member 110 comprises synthetic resin block bodies 111 linked with each other. The synthetic resin block bodies include injection molding pieces. The number of parts required for the articulated supporting member 110 is reduced compared to the prior are in which various long and short supporting members have to be stocked corresponding to the desired usage.

The articulated supporting members 110 are inserted and stored, respectively, in the tubular storing portions 121 arrayed on both lateral sides in the belt width direction of the flexible belt member 120 as shown in FIG. 1.

Thereby, the articulated supporting members 110 can keep the flexible belt member 120 in a laterally well-balanced manner without causing torsion or deflection on both sides in the belt width direction of the flexible belt member 120 during movement and operation between a straight posture and the bending posture.

As shown in FIGS. 2 and 3, a link pin 111a is provided at a front side surface region of the synthetic resin block body 111 which fits concavo-convexly with a link pin hole 111b provided at a rear side surface region of a preceding synthetic resin block body 111. As such the synthetic resin block bodies are linked so that they may rotate with respect to each other.

Thus, the link pin 111a of the succeeding synthetic resin block body 111 is axially and rotatably supported by the link pin hole 111b of the preceding synthetic resin block body 111.

Furthermore, as shown in FIGS. 4 and 5, a tapered cutaway fitting portion 111c for concavo-convexly and vertically fitting the link pin 111a of the front side surface region to the link pin hole 111b of the rear side surface region is illustrated. Tapered cutaway fitting portion 111c is concavely provided from an upper surface continuously to the link pin hole 111b of the rear side surface region.

Thereby, link pin 111a of the succeeding synthetic resin block body 111 can be attached to the link pin hole 111b of the preceding synthetic resin block body 111 via the tapered cutaway fitting portion 111c thereof without requiring excessive fitting force in cutting and connecting the synthetic resin block bodies 111 of the articulated supporting member 110.

The synthetic resin block body iii also is provided with a straight posture keeping plane 111d for maintaining the synthetic resin block bodies 111 in a straight condition and a bending posture keeping plane 111e for maintaining the synthetic resin block bodies 111 in a bending condition as shown in FIGS. 6 and 7.

Thereby, the straight posture keeping plane 111d and the bending posture keeping plane 111e position and retain the articulated supporting member 110 in the straight posture and the bending posture required by the articulated supporting member 110.

It is noted that the synthetic resin block body 111 described above has substantially rectangular sections whose four corners are chamfered along a longitudinal direction thereof as schematically shown in FIGS. 2 through 5.

Thereby, the four corners of the synthetic resin block body 111 are not caught within the tubular storing portion 121 even if the synthetic resin block bodies 111 are relatively displaced up and down, and, left and right, within the tubular storing portion 121 of the flexible belt member 120. Thus, the articulated supporting member 110 composed of the large number (plurality) of linked synthetic resin block bodies 111 operates between the bending posture and the straight posture smoothly within the tubular storing portion 121 of the flexible belt member 120.

All of the synthetic resin block bodies 111 composing the articulated supporting member 110 used in the articulated cable protection and guide apparatus 100 of the present embodiment are molded by glass-fiber reinforced polyamide 66 resin.

Thereby, it becomes possible to readily mold the link pin 111a at the front side surface region, the link pin hole 111b at the rear side surface region, the tapered cutaway fitting portion 111c for concavo-convexly fitting the link pin, the straight posture keeping plane 111d for keeping the straight condition, the bending posture keeping plane 111e for keeping the bending condition and others features of the synthetic resin block bodies 111. It becomes also possible to easily produce the light-weight synthetic resin block bodies 111 that can be cut and connected corresponding to usage requirements. The glass-fiber reinforced polyamide 66 resin exhibits its self-lubricant effect so that the link pin 111a is smoothly turned with respect to the link pin hole 111b at the axial support portion and the power required for shifting between the bending posture and the straight posture is considerably reduced.

Although not shown, the flexible belt member 120 described above is formed by using two sheets in which fluororesin layers are laminated on both front and back surfaces of a polyurethane resin layer. Then, the six tubular storing portions 121 for inserting the cables, C, which have vertically symmetrical wavy sections equally parted in the belt width direction are integrally molded between the two sheets by bulging to the front and back surfaces of the sheets.

Thereby, the polyurethane resin layer exhibits the elasticity of the flexible belt member 120 and the self-lubricant effect of the fluororesin layers exhibits slidability of the flexible belt member 120 and protect the cables, C, without resistance.

The flexible belt member 120 is molded out of synthetic resin materials. Thereby, the shape of the tubular storing portions 121 composing the flexible belt member 120 can be readily processed and molded.

A specific configuration of the connector unit 130, which is the most characteristic part of the articulated cable protection and guide apparatus 100 of the embodiment of the invention, will now be explained in detail with reference to FIGS. 8 through 11.

Connector unit 130 described above comprises an elastically deformable dust-proofing protector 131 into which the slot end portions of the flexible belt member 120 storing the articulated supporting member 110 and the cables, C, are inserted and attached. Referring to FIG. 8, synthetic resin pressing pads 132 attached at upper and lower outer circumferential parts of the dust-proofing protector 131, a pair of clamping plates 133 clamping the dust-proofing protector 131 through an intermediate pair of synthetic resin pressing pads 132, and a fixing means 134 such as hexagonal bolts for fixing the pair of clamping plates 133 to the machine frame-side fixing end area or the machine movable-side moving end area are illustrated.

Thereby, the flexible belt member 120 through which the articulated supporting member 110 and the cables, C, are respectively inserted is elastically clamped by the pair of clamping plates 133. Elastically deformable dust-proofing protectors 131 and pairs of synthetic resin pressing pads 132 reside within the clamping plates.

Dust-proofing protector 131 comprises a dust-proofing protector proximal end portion 131a clamped by the pair of synthetic resin pressing pads 132 and a tapered insertion portion 131b projecting from the dust-proofing protector proximal end portion 131a, respectively. As illustrated in FIG. 8, there are six pairs of pressing pads 132 and six proximal end portions 131a and six tapered insertion portions. There are four cables, C, illustrated in FIG. 8.

Thereby, it becomes possible to make the dust-proofing protector proximal end portion 131a to be elastically deformable corresponding to outer circumferential shapes of the articulated supporting member 110 and the cables, C, and to adjust the cutting size of the tapered insertion portion 131b. This enables the cutting and opening of the tapered insertion portion 131b so that the tapered insertion portion 131b is opened in a manner close to an outer circumference and diameter of the cables, C.

The synthetic resin pressing pads 132 are disposed respectively in a curved state straddling over the articulated end portions of the articulated supporting member 110. The cable end portions of the cables, C, are disposed through the intermediary of the dust-proofing protector proximal end portion 131a.

Thereby, when the dust-proofing protector 131 is clamped by the pair of clamping plates 133 through the intermediary of the pair of synthetic resin pressing pads 132, both side edges 132a of the synthetic resin pressing pad 132 are positioned while biting into the dust-proofing protector proximal end portion 131a. The resin pressing pad is shown biting the proximal end portion 131a in the curved condition respectively straddling over the articulated end portions of the articulated supporting member 110 and the cable end portions of the cables, C.

The dust-proofing protector 131 described above is molded out of an elastically deformable material which is more deformable than the synthetic resin pressing pad 132. Put another way, the resin pressing pads are harder than the dust-proofing protector.

When the dust-proofing protector 131 is clamped by the pair of clamping plates 133 through the intermediary of the pair of synthetic resin pressing pads 132, the dust-proofing protector 131 elastically deforms preferentially more than the synthetic resin pressing pad 132. Dust-proofing protector 131 is deformed and fits and adheres to the outer circumferential shapes of the articulated supporting member 110 and the cables, C, thus preventing intrusion of dust into the flexible belt member. Synthetic resin pressing pads 132 are pressed by the pair of clamping plates 133 and contact between synthetic resin pressing pads 132 and the clamping plates 133 is increased.

Connector units 130 fixed to the machine frame-side fixing end area and the machine movable-side moving end area integrally retain the articulated end portions of the articulated supporting member 110, the cable end portions of the cables, C, and the slot end portions of flexible belt member 120. The integral retention of the slot end portion of the flexible belt member seals the slot end portions of the flexible belt member 120. The invention assures a clean cable environment as the cables are sealed as just described.

Connector unit 130 includes the elastically deformable dust-proofing protector 131. The slot end portions of the flexible belt member 120 reside within the dust-proofing protector. Flexible belt member 120 stores the articulated supporting member 110 and cables, C. The synthetic resin pressing pads 132 are attached at the upper and lower outer circumferential parts of the dust-proofing protector 131. The pair of clamping plates 133 apply pressure to the dust-proofing protector 131 through the intermediary of the pair of synthetic resin pressing pads 132 and the fixing means 134. Fixing means 134 affix the pair of clamping plates 13 to the machine frame-side fixing end area or the machine movable-side moving end area while being inserted through the clamping plates. The connector unit exhibits the cushioning mechanism and prevents the flexible belt member 120 from being unintentionally damaged if intolerable force acts on the flexible belt member 120 while bending the cables, C.

The dust-proofing protector 131 comprises the dust-proofing protector proximal end portion 131a clamped through the intermediary of the pair of synthetic resin pressing pads 132 and the six tapered insertion portions 131b projecting from the dust-proofing protector proximal end portion 131a respectively, at least per every cable end of the cables, C. The dust-proofing protector proximal end portion 131a adheres and securely retains the articulated supporting member 110 and the cables, respectively even if diameters and sectional shapes of the articulated supporting member 110 and the cables, C, are different from each other. Furthermore, it becomes possible to completely contain the abrasion powder of the articulated supporting member 110 and the cables, C, produced within the individual tubular storing portions 121 of the flexible belt member 120. Abrasion powder is produced within the storing portions by bending and moving the cables, C, within the individual tubular storing portions 121 of the flexible belt member 120. Thus, the advantageous effects of the articulated cable protection and guide apparatus of the invention are remarkable.

The invention may take any mode as long as the articulated cable protection and guide apparatus comprises the articulated supporting member that is composed of a large number of synthetic resin block bodies linked with each other and that operates between the straight posture and the bending posture. The flexible belt member includes a plurality of tubular storing portions through which the articulated supporting member and the cables are separately inserted and stored in parallel in the belt width direction. The connector units to be fixed to the machine frame-side fixing end area and the machine movable-side moving end area integrally retain the articulated end portions of the articulated supporting member, the cable end portions of the cables, and the slot end portions of the flexible belt member sealing the slot end portions of the flexible belt member. Then, it is capable of assuring that no abrasion powders from the cables will enter the environment. The invention prevents scattering abrasion powder of the articulated supporting member and the cables to the outside. The invention securely guides cables between the machine frame-side fixing end area and the machine movable-side moving end area. The connector units are easily installed to the machine frame-side fixing end area and the movable-side moving end area.

For instance, a material of the flexible belt member used in the articulated cable protection and guide apparatus of the invention may be a synthetic resin material from which the plurality of tubular storing portions and others components can be made. When fluororesin layers are laminated on both the front and back surfaces of an extensible layer, the extensible layer can exhibit extensibility of the flexible belt member and the fluororesin layer can exhibit slidability of the flexible belt member.

Here, it is preferable to use PTFE (polytetrafluoroetylene) for the fluororesin layer of the flexible belt member because it has low friction and it is preferable to use polyurethane resin for the extensible layer.

The specific configuration of each flexible belt member described above may be either one having the plurality of tubular storing portions equally parted in the belt width direction and having the circular cross-section, one having the plurality of tubular storing portions equally parted in the belt width direction and having the rectangular cross-section or the plurality of tubular storing portions parted equally in the belt width direction and having the vertically symmetrical wavy cross-sections, or one having those plurality of shapes of tubular storing portions as shown in FIGS. 10 and 11 for example.

The user of the articulated cable protection and guide apparatus may select the number of tubular storing portions in the flexible belt member. The number may be any number as long as it is at least a plural number to insert and store the articulated supporting member and/or the cables.

The specific configuration of the articulated supporting member used in the articulated cable protection and guide apparatus of the invention may be any configuration as long as it is composed of the large number of synthetic resin block bodies flexibly linked by concavo-convexly fitting with each other.

One configuration of the synthetic resin block body may include a link having a concavo-convexly fitting, the link pin provided at the front side surface region of the synthetic resin block body and inserted in the link pin hole provided at the rear side surface region of the preceding synthetic resin block body. This is the preferred structure of the resin block body.

Alternatively, another configuration of the synthetic resin block body may include a link having a concavo-convexly fitting, the link pin provided at the rear side surface region of the synthetic resin block body and inserted in the link pin hole provided at the front side surface region of the succeeding synthetic resin block body.

The specific material of the synthetic resin block body described above may be any synthetic resin material as long as it is capable of keeping the shapes of the link pin at the front side surface region, the link pin hole at the rear side surface region, the tapered cutaway fitting portion for concavo-convexly fitting the link pin, the straight posture keeping plane for keeping the straight condition, the bending posture keeping plane for keeping the bending condition and other structural features. For example, it is preferable to adopt and use glass-fiber reinforced polyamide 66 resin, polyacetal resin and ABS resin. When the glass-fiber reinforced polyamide 66 resin is used in particular, rigidity and abrasion resistance of the articulated supporting member are improved. Accordingly, the articulated supporting member can fully withstand long repetitive uses and can achieve a long life.

The articulated supporting members described above are inserted and stored respectively in the tubular storing portions arrayed on the both lateral sides of the flexible belt, member, so that the articulated supporting members can keep the flexible belt member in a laterally well-balanced manner without causing torsion or deflection in the flexible belt member in operating between the straight posture and the bending posture. However, it is also possible to insert and store the articulated supporting member in a tubular storing portion arrayed at the center of the flexible belt member.

Any mode of the invention is acceptable as long as it comprises the dust-proofing protector, the synthetic resin pressing pads, the pair of clamping plates and the fixing means, respectively and it integrally fixes the articulated end portions of the articulated supporting members, the cable end portions of the cables and the slot end portion of the flexible belt member to the machine frame-side fixing end area or the machine movable-side moving end area. For instance, a number of installed synthetic resin pressing pads may be appropriately determined corresponding to a number of cables to be guided.

The specific configuration of the dust-proofing protector may be any configuration as long as it comprises the dust-proofing protector proximal end portion clamped through the intermediary of the pair of synthetic resin pressing pads and the plurality of tapered insertion portions projecting from the dust-proofing protector proximal end portion per at least each cable end portion of the cables, C.

The concrete configuration of the tapered insertion portion is preferable to be tapered so that it can be cut to open at position coincident with an outer circumference of the cables corresponding to a diameter and others of the cables, i.e., in the condition adhering the cables, because it completely contains the abrasion powder of the cables produced within the individual tubular storing portions of the flexible belt member during bending and moving the cables.

The specific configuration of the synthetic resin pressing pad may be any configuration as long as the synthetic resin pressing pads are disposed respectively in the curved state straddling over the articulated end portions of the articulated supporting member and the cable end portions of the cables through the intermediary of the dust-proofing protector proximal end portion and both side edges of the synthetic resin pressing pads are positioned while biting into the dust-proofing protector proximal end portion. The synthetic resin pressing pads straddle over the articulated end portions of the articulated supporting member and the cable end portions of the cables when the dust-proofing protector is clamped by the pair of clamping plates through the intermediary of the pair of synthetic resin pressing pads. For example, the synthetic resin pressing pad may be any synthetic resin pressing pad as long as it is formed of synthetic resin rubber and its curved sectional shape may be formed of a plurality of circular are parts or may be formed of a plurality of circular are parts and a straight part.

In addition, as for the dust-proofing protector and the synthetic resin pressing pad used in the articulated cable protection and guide apparatus of the invention, it is preferable to mold the dust-proofing protector from material elastically more deformable than the synthetic resin pressing pad because the dust-proofing protector elastically deforms preferentially more than the synthetic resin pressing pad and fits and adheres to the outer circumferential shapes of the articulated supporting member and the cables. When the dust-proofing protector is clamped by the pair of clamping plates through the intermediary of the pair of synthetic resin pressing pads and because the synthetic resin pressing pads are clamped by the clamping plates, the contact between the synthetic resin pressing pads and the clamping plates is increased.

The concrete configuration of the pair of clamping plates composing the part of the connector unit may have any configuration as long as they clamp the dust-proofing protector through the intermediary of the pair of synthetic resin pressing pads. For example, plate planes for clamping the dust-proofing protector through the intermediary of the synthetic resin pressing pads may be any one of a fiat plate or an irregular or wavy plate corresponding to the number of articulated supporting members and the cables to be mounted. If the clamping plates have wavy clamping plates, the clamping plates can securely fix the articulated supporting members and cables without slide slip in the condition of positioning them.

What is claimed is:

1. An articulated cable protection and guide apparatus, comprising:
   a plurality of cables;
   each of said cables includes a first cable end portion and a second cable end portion;
   an articulated supporting member;
   said articulated supporting member includes: a large number of synthetic resin block bodies linked with each other; said synthetic resin block bodies operating between a straight posture and a bending posture; a first articulated end portion, and, a second articulated end portion;

a machine;

said machine includes a machine frame-side fixing end area and a machine movable-side moving end area;

a flexible belt member;

said flexible belt member includes a length, a width, a first slot end portion and a second slot end portion;

said flexible belt member includes a plurality of tubular storing portions, said articulated supporting member separately inserted in one of said plurality of tubular storing portions; each of said cables separately inserted in respective other ones of said plurality of tubular storing portions; and, said articulated supporting member and said cables stored and formed in parallel;

said cables being protected within said other ones of said tubular storing portions of said flexible belt member and guided between said machine frame-side fixing end area and said machine movable-side moving end area;

a first connector unit and a second connector unit;

said first connector unit affixed to said machine frame-side fixing end area and said second connector unit affixed to said machine movable-side moving end area;

said first connector unit integrally retains said first articulated end portion of said articulated supporting member, said first connector unit integrally retains said first cable end portions, and said first connector unit integrally retains said first slot end portion of said flexible belt member;

said first connector unit seals said first slot end portion of said flexible belt member against said first cable end portions and against said first articulated end portion of said articulated supporting member;

said second connector unit integrally retains said second articulated end portion of said articulated supporting member, said second connector unit integrally retains said second cable end portions, and said second connector unit integrally retains said second slot end portion of said flexible belt member;

said second connector unit seals said second slot end portion of said flexible belt member against said second cable end portions and against said second articulated end portion of said articulated supporting member;

said first connector unit comprises: an elastically deformable dust-proofing protector; synthetic resin pressing pads; a pair of clamping plates; said dust-proofing protector surrounding said first slot end portion of said flexible belt member and said cables; said synthetic resin pressing pads attached to an upper outer circumferential part and to a lower outer circumferential part of said dust-proofing protector, said synthetic resin pressing pads residing intermediate said pair of clamping plates and said dust-proofing protector; said pair of clamping plates gripping and cushioning said dust-proofing protector through said synthetic resin pressing pads; a fixing means for fixing said pair of clamping plates to said machine frame-side fixing end area; said dust-proofing protector comprises a dust-proofing protector proximal end portion clamped between said synthetic resin pressing pads; said dust-proofing protector comprises a plurality of tapered insertion portions projecting from said dust-proofing protector proximal end portion, respectively, at least per every first cable end portion of said cables; and, said first cable end portions residing within respective ones of said plurality of tapered insertion portions.

2. The articulated cable protection and guide apparatus according to claim 1, wherein:
said synthetic resin pressing pads are disposed respectively in a curved state straddling over said dust-proofing protector.

3. The articulated cable protection and guide apparatus according to claim 1, wherein:
said dust-proofing protector is molded out of a material more elastically deformable than said synthetic resin pressing pads.

4. The articulated cable protection and guide apparatus according to claim 1, wherein said flexible belt member is molded out of synthetic resin materials.

5. The articulated cable protection and guide apparatus according to claim 1, wherein:
each of said synthetic resin block bodies includes a link pin provided at a front side surface region of each of said synthetic resin block bodies composing said articulated supporting member,
each of said synthetic resin block bodies includes a link pin hole provided at a rear side surface region; and,
said link pin is axially supported by said link pin hole provided at a rear side surface region of a preceding synthetic resin block body.

6. The articulated cable protection and guide apparatus according to claim 5, wherein each of said synthetic resin block bodies includes a surface and wherein a tapered cutaway fitting portion for concavo-convexly and vertically fitting said link pin of said front side surface region to said link pin hole of said rear side surface region is concavely provided continuously from said surface to said link pin hole of said rear side surface region.

7. The articulated cable protection and guide apparatus according to claim 1, wherein each of said synthetic resin block bodies is provided with a straight posture keeping plane for maintaining said synthetic resin block bodies in a straight condition and a bending posture keeping plane for maintaining said synthetic resin block bodies in a bending condition.

8. An articulated cable protection and guide apparatus, comprising:
a plurality of cables;
each of said cables includes a first cable end portion and a second cable end portion;
an articulated supporting member;
said articulated supporting member includes: a large number of synthetic resin block bodies linked with each other; said synthetic resin block bodies operating between a straight posture and a bending posture; a first articulated end portion, and, a second articulated end portion;
a machine;
said machine includes a machine frame-side fixing end area and a machine movable-side moving end area;
a flexible belt member;
said flexible belt member includes a length, a width, a first slot end portion and a second slot end portion;
said flexible belt member includes a plurality of tubular storing portions, said articulated supporting member separately inserted in one of said plurality of tubular storing portions; each of said cables separately inserted in respective other ones of said plurality of tubular storing portions; and, said articulated supporting member and said cables stored and formed in parallel;
said cables being protected within said other ones of said tubular storing portions of said flexible belt member and guided between said machine frame-side fixing end area and said machine movable-side moving end area;

a first connector unit and a second connector unit;

said first connector unit affixed to said machine frame-side fixing end area and said second connector unit affixed to said machine movable-side moving end area;

said first connector unit integrally retains said first articulated end portion of said articulated supporting member, said first connector unit integrally retains said first cable end portions, and said first connector unit integrally retains said first slot end portion of said flexible belt member;

said first connector unit seals said first slot end portion of said flexible belt member against said first cable end portions and against said first articulated end portion of said articulated supporting member;

said second connector unit integrally retains said second articulated end portion of said articulated supporting member, said second connector unit integrally retains said second cable end portions, and said second connector unit integrally retains said second slot end portion of said flexible belt member;

said second connector unit seals said second slot end portion of said flexible belt member against said second cable end portions and against said second articulated end portion of said articulated supporting member;

said second connector unit comprises: an elastically deformable dust-proofing protector; synthetic resin pressing pads; a pair of clamping plates; said dust-proofing protector surrounding said second slot end portion of said flexible belt member and said cables; said synthetic resin pressing pads attached to an upper outer circumferential part and to a lower outer circumferential part of said dust-proofing protector, said synthetic resin pressing pads residing intermediate said pair of clamping plates and said dust-proofing protector; said pair of clamping plates gripping and cushioning said dust-proofing protector through said synthetic resin pressing pads; a fixing means for fixing said pair of clamping plates to said machine movable-side moving end area; said dust-proofing protector comprises a dust-proofing protector proximal end portion clamped between said synthetic resin pressing pads; said dust-proofing protector comprises a plurality of tapered insertion portions projecting from said dust-proofing protector proximal end portion, respectively, at least per every second cable end portion of said cables; and, said second cable end portions residing within respective ones of said plurality of tapered insertion portions.

9. The articulated cable protection and guide apparatus according to claim 8, wherein:

said synthetic resin pressing pads are disposed respectively in a curved state straddling over said dust-proofing protector.

10. The articulated cable protection and guide apparatus according to claim 8, wherein:

said dust-proofing protector is molded out of a material more elastically deformable than said synthetic resin pressing pads.

11. The articulated cable protection and guide apparatus according to claim 8, wherein said flexible belt member is molded out of synthetic resin materials.

12. The articulated cable protection and guide apparatus according to claim 8, wherein:

each of said synthetic resin block bodies includes a link pin provided at a front side surface region of each of said synthetic resin block bodies composing said articulated supporting member, each of said synthetic resin block bodies includes a link pin hole provided at a rear side surface region; and, said link pin is axially supported by said link pin hole provided at a rear side surface region of a preceding synthetic resin block body.

13. The articulated cable protection and guide apparatus according to claim 12, wherein each of said synthetic resin block bodies includes a surface and wherein a tapered cut-away fitting portion for concavo-convexly and vertically fitting said link pin of said front side surface region to said link pin hole of said rear side surface region is concavely provided continuously from said surface to said link pin hole of said rear side surface region.

14. The articulated cable protection and guide apparatus according to claim 8, wherein each of said synthetic resin block bodies is provided with a straight posture keeping plane for maintaining said synthetic resin block bodies in a straight condition and a bending posture keeping plane for maintaining said synthetic resin block bodies in a bending condition.

* * * * *

UNITED STATES PATENT AND TRADEMARK OFFICE
CERTIFICATE OF CORRECTION

PATENT NO. : 8,662,456 B2
APPLICATION NO. : 13/352314
DATED : March 4, 2014
INVENTOR(S) : Komiya It is certified that error appears in the above-identified patent and that said Letters Patent is hereby corrected as shown below:

In the Specification

Col. 2, line 12, after "caused by" delete "betiding" and insert --bending-- therefor.

Col. 9, line 7, after "prior" delete "are" and insert --art-- therefor.

Col. 9, line 43, after "body" delete "iii" and insert --111-- therefor.

Col. 11, line 43, after "plates" delete "13" and insert --133-- therefor.

Col. 12, line 12, after "cables," insert --C,--.

Col. 14, line 27, after "circular" delete "are" and insert --arc-- therefor.

Col. 14, line 28, after "circular" delete "are" and insert --arc-- therefor.

Col. 14, line 51, after "one of a" delete "fiat" and insert --flat-- therefor.

Signed and Sealed this
Twenty-fourth Day of June, 2014

Michelle K. Lee
*Deputy Director of the United States Patent and Trademark Office*